United States Patent [19]
Argade

[11] Patent Number: 5,138,570
[45] Date of Patent: Aug. 11, 1992

[54] MULTIPLIER SIGNED AND UNSIGNED OVERFLOW FLAGS

[75] Inventor: Pramod V. Argade, Allentown, Pa.

[73] Assignee: AT&T Bell Laboratories, Murray Hill, N.J.

[21] Appl. No.: 585,443

[22] Filed: Sep. 20, 1990

[51] Int. Cl.[5] .............................................. G06F 7/52
[52] U.S. Cl. ..................................... 364/760; 364/745
[58] Field of Search ................ 364/760, 745, 736.5

[56] References Cited

U.S. PATENT DOCUMENTS

| | | | |
|---|---|---|---|
| 4,153,938 | 5/1979 | Ghest et al. ........................ | 364/760 |
| 4,534,010 | 8/1985 | Kobayashi et al. ................. | 364/745 |
| 4,700,324 | 10/1987 | Doi et al. ............................ | 364/745 |
| 4,893,267 | 1/1990 | Alsup et al. ......................... | 364/745 |
| 4,941,119 | 7/1990 | Moline ................................ | 364/745 |

OTHER PUBLICATIONS

WE 32100 Microprocessor Information Manual, Jan. 1985, pp. 3–85.
WE 32200 Microprocessor Advanced Information Data Sheet, Oct. 1986, Comcode 105195770, two pages.
Clipper C300 Data Sheet, 32-Bit Compute Engine, Intergraph Advanced Processor Division, Sep., 1988, pp. 8, 26, and 29.
Intel 80386 Programmer's Reference Manual, 1986, pp. 3-7, 17-63, 17-64 17-116, 17-117.
Motorola MC68020 32-Bit Microprocessor User's Manual, Prentice-Hall, Inc. Englewood Cliffs, N. J. 07632, with Cover Book Credentials, pp. B-118 B-119, B-120 and B-121.

*Primary Examiner*—David H. Malzahn
*Attorney, Agent, or Firm*—James H. Fox

[57] ABSTRACT

When performing fixed point multiplication with 32 bit operands for example, the product is, in general, represented by a 64 bit number. However, a typical microprocessor may compute the product to only 32 bits. Therefore, the possibility of overflow exists. The present invention provides an indication as to the status of the upper (most significant) 32 bits of the product. This indication may include both "carry" and "overflow" flags, which are unsigned and signed overflow, respectively. The inventive technique is implemented in hardware that is used in conjunction with a Booth recoding multiplier.

4 Claims, 4 Drawing Sheets

FIG. 4  OVERFLOW FLAG GENERATION

MULTIPLIER SIGNED AND UNSIGNED OVERFLOW FLAGS

BACKGROUND OF THE INVENTION

1. Field of the Invention

The present invention relates to an integrated circuit having a multiplier that provides signed and/or unsigned overflow flags.

2. Description of the Prior Art

Although integer multiplication is a ubiquitous arithmetic operation, implementing it on a microprocessor requires a large amount of resources and/or takes many clock cycles to complete, and hence different implementations of the multiply instruction are found on commercial microprocessors. While some microprocessors support only a "multiply step" instruction, some high-end processors implement a multiplier in hardware. Many processors achieve multiplication using the Booth algorithm.

In most microprocessors, the possibility of overflow exists when performing multiplication, as follows: If two n-bit operands are multiplied, the result is 2n-bits wide in a general case. Since the ALU is typically n-bits wide, it is impractical to compute the full 2n-bit result of a multiplication using the existing ALU. Consequently, many processors compute only the lower n-bits of the result; thus, there may be loss of precision. That is, the result is correct, and there is no loss of precision, only if the upper n bits are zero. Otherwise, to obtain full precision in a n-bit multiplier, the full product has to be computed by decomposing the multiplicand and the multiplier each into n/2 bit operands and carrying out four multiplications, and then reconstructing the complete 2n-bit product. Thus, for the processors which compute the lower n-bits of the result, there has to be a mechanism, such as setting a flag in the status word, to signal whether there is a loss of precision.

For example, the product obtained by multiplying two 32 bit numbers is a 64 bit number. However, if the product is computed to only 32 bits, as is typical in single-chip microprocessors, then the programmer must ensure by various software techniques that the result does not exceed 32 significant bits. Otherwise, the most significant bits of the result could be lost. Another way to avoid overflow is to utilize double-precision multiplication (e.g., 64 bits). However, that requires either a significant increase in hardware requirements, or else an increase in computation time. It is known to include one or more overflow flags in the circuitry of integrated circuit multipliers. The overflow ("V") flag is set when an overflow results from the multiplication of signed numbers. The carry ("C") flag is set when an overflow results from the multiplication of unsigned numbers. However, in many prior art applications, the control of the "V" flag has required double-precision multiplication, thereby increasing the computation time, or requiring significant additional circuitry, as compared to the case where only single-precision multiplication is required.

Multiplication of two operands that are represented in 2's complement form is complicated by the fact that the upper word (n bits) of the result is different depending upon whether the two operands are to be treated as signed or unsigned (note that the lower n bits of the result are always the same). That is, the most significant bit of a signed number is the sign bit, with a "0" representing a positive number and a "1" representing a negative number. For an unsigned number, the first bit is simply the most significant digit. Hence, for example, for word size n=8, a signed multiplication of 0xff (where 0x represents hexadecimal representation) with itself yields 0x01 as the lower product and 0x00 as the upper product. On the other hand, an unsigned multiplication of 0xff with itself again yields 0x01 as the lower product but 0xfe as upper product. Furthermore, there are cases where the upper word is zero but the lower n bits do not correctly represent the product. For example, multiplying two positive integers such as 0x40 by 0x20 gives 0x80 as a result, which is negative in 2's complement representation. Some microprocessors thus support separate signed and unsigned multiply instructions, and each instruction sets the same flag (usually the "C" flag) to signal a loss of precision.

In one commercial 32-bit microprocessor that uses the shift-and-add technique to perform multiplication, all multiplications are done on unsigned operands. If multiplication is to be performed on signed operands, they are first converted to unsigned form, the multiplication is accomplished, and the result converted back to signed number form. A single flag (V) is then set if overflow occurs during multiplication, although the control of the flag may be different for the two cases. However, for increased speed of operation, most microprocessors accomplish multiplication with the modified Booth algorithm, which repeatedly uses the arithmetic-logic unit (ALU). It has proven especially difficult for workers in the art to implement an overflow indicator that would reliably indicate overflow in essentially real-time when using the Booth algorithm; that is, while the multiplication is in progress, so that the value of the C and V flags are available when the multiplication is complete. This can be understood when it is realized that there are $2^{64}$ possible cases under which the flags could be tested for 32 bit multiplication. It appears that no microprocessors that implement an overflow indicator for use with a Booth multiplier have been developed.

SUMMARY OF THE INVENTION

I have invented an integrated circuit that includes means for multiplying a multiplicand (A) and a multiplier (B) each having n-bits, in order to generate a result (R) having n bits. The integrated circuit comprises means for setting a flag when the number of bits of the product is greater than n. Separate flags for overflow from signed and unsigned multiplication may be provided.

DETAILED DESCRIPTION

Figure 1:
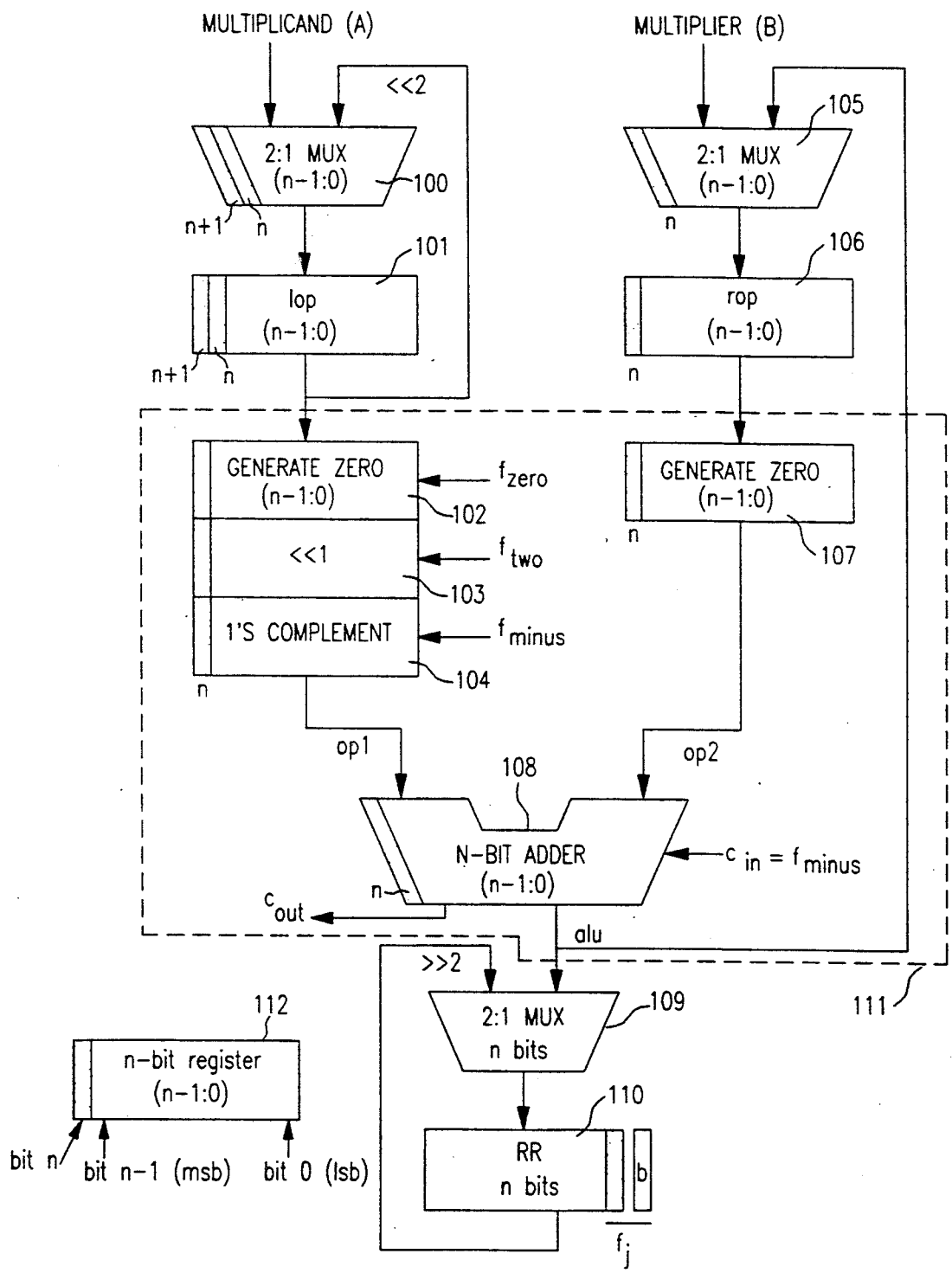
FIG. 1 shows an illustrative implementation of the invention.

In the following detailed description, a review of the prior art Booth multiplication technique is first provided.

Modified Booth Algorithm: The Booth algorithm speeds up the "shift and add" approach of multiplication by examining multiple bits of the multiplier at a time. Consider n-bit integers A and B:

$$A = \sum_{i=0}^{n-1} 2^i a_i \quad (1)$$

$$B = \sum_{i=0}^{n-1} 2^i b_i \quad (2)$$

where the subscript denotes the significance of the bit, $a_i$ and $b_i$ assumes values 0 and 1, and n is the word size. The modified Booth algorithm is equivalent to rewriting A as $$A = 2^n a_{n-1} + \sum_{j=0}^{n/2-1} 2^{2j} f_j \quad (3)$$

where, $$f_j = -2a_{2j+1} + a_{2j} + a_{2j-1} \quad (4)$$

From (2) and (4), the product of A and B can be written as:

$$A \times B = 2^n a_{n-1} B + \sum_{j=0}^{n/2-1} f_j \{2^{2j} B\} \quad (5)$$

Table I summarizes values assumed by $f_j$.

TABLE I

Values assumed by the Booth factor $f_j$, and equivalent signals for the ALU

| $a_{2j+1}$ | $a_{2j}$ | $a_{2j-1}$ | $f_j$ | $f_{zero}$ | $f_{minus}$ | $f_{two}$ |
|---|---|---|---|---|---|---|
| 0 | 0 | 0 | 0 | 1 | 0 | 0 |
| 0 | 0 | 1 | 1 | 0 | 0 | 0 |
| 0 | 1 | 0 | 1 | 0 | 0 | 0 |
| 0 | 1 | 1 | 2 | 0 | 0 | 1 |
| 1 | 0 | 0 | −2 | 0 | 1 | 1 |
| 1 | 0 | 1 | −1 | 0 | 1 | 0 |
| 1 | 1 | 0 | −1 | 0 | 1 | 0 |
| 1 | 1 | 1 | 0 | 1 | 0 | 0 |

Since $f_j$ can assume values 0, ±1, ±2, in order to evaluate the summation in (5), the multiplicand has to be either zeroed, kept the same or left shifted, and added or subtracted from the partial sum. In addition to multiplying the multiplicand by $f_j$, it also has to be multiplied by 4 to scale it in successive iterations, in order to multiply by $2^{2j}$. This latter multiplication may be accomplished by left-shifting the multiplicand by 2 bits (<<2). Note that the first term in (5) contributes to the upper word of the product only, hence, in order to determine the lower n-bits of the product, a sum of n/2 terms has to be evaluated. The Booth algorithm thus speeds up the multiplication by decreasing the number of summations by half. Since left shift, zero generate, and add/subtract are parts of a typical ALU, no additional hardware is required to implement the Booth algorithm outlined above. The Booth algorithm described above uses three bit encoding of the multiplier, and it can be generalized to encode more bits and thus make the multiplication even faster (although some additional hardware is required). In the following discussion, we assume a modified Booth algorithm with a three bit encoding.

Table I shows how $f_j$ can be decomposed into three signals, $f_{zero}$, $f_{minus}$, and $f_{two}$, which are known in the art for generating the Booth factor $f_j$. Equations (6) –(8) give the logic for these signals, where the subscript denotes the bit significance, the bar denotes a complemented signal, $\wedge$ indicates the logical AND operation, and $\vee$ indicates the logical OR operation.

$$f_{zero} = \{\overline{a_{2j+1}} \wedge \overline{a_{2j}} \wedge \overline{a_{2j-1}}\} \vee \{a_{2j+1} \wedge a_{2j} \wedge a_{2j-1}\} \quad (6)$$

$$f_{minus} = a_{2j+1} \wedge \{\overline{a_{2j}} \vee \overline{a_{2j-1}}\} \quad (7)$$

$$f_{two} = \{\overline{a_{2j+1}} \wedge a_{2j} \wedge a_{2j-1}\} \vee \{a_{2j+1} \wedge \overline{a_{2j}} \wedge \overline{a_{2j-1}}\} \quad (8)$$

Figure 2:
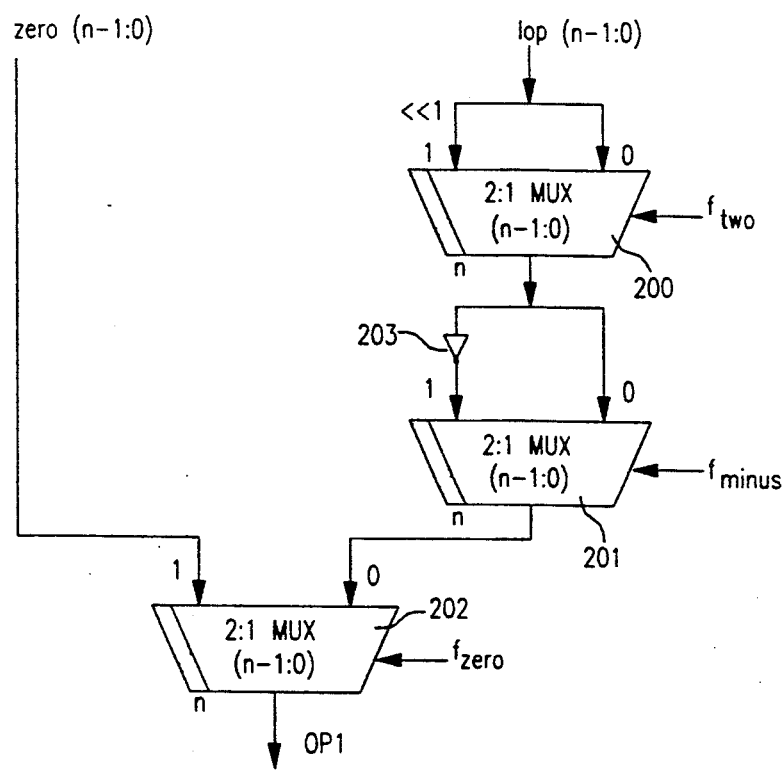
FIG. 2 shows a method of implementing the Booth multiplier of FIG. 1.

A Hardware implementation of the Booth Algorithm: A block diagram of the hardware required for the Booth Algorithm as it may be implemented on a microprocessor is shown in the FIG. 1. The unshaded elements are required to implement the Booth algorithm and are all n-bits wide. This implementation uses a typical configuration of an adder (108) where two operands, op1 and op2, and an input carry $c_{in}$ are supplied and a sum (alu) and an output carry $c_{out}$ are generated from the most significant bit (i.e, bit n−1). A 2-to-1 multiplexer (100) supplies the multiplicand (A) to the left operand register (101), referred to herein as the "lop". Additional hardware in the ALU (111) enables generating zero (means 102), left shifting by one (means 103), and generating the one's complement of the lop (means 104). The two's complement of the lop can then be accomplished by first doing the one's complement, and then setting the input carry, $c_{in}$, to one. Since the Booth factor $f_j$ assumes values 0, ±1, ±2, the above hardware is sufficient to multiply the lop by the Booth factor, and thus to evaluate the sum in (5). One embodiment of the means 102, 103 and 104 is shown in FIG. 2. The "generate zero" function (102) is performed by selecting input 1 of the mux 202; for the other functions, input 0 is selected. The "left-shift" function (103) is performed by selecting input 1 of the mux 200. The "one's complement" function (104) is performed by selecting the input 1 of the mux 201, whereby inverter 203 preforms the required inversion.

The result from the ALU, which is the partial product, can be loaded back into the right operand register (106), or can be loaded into the result register (110) when the Booth iteration(s) and hence the multiplication is complete. There is also a provision to shift the lop left by two bits in order to scale it, shift the result register (110) right by two bits, and provide one extra bit storage (b) in the result register to evaluate the successive Booth factors. Initially, the multiplier (B) is loaded in the result register by first loading it in the right operand register (106), referred to herein as the rop, through the multiplexer 105, referred to herein as the rop mux. Then, op1 is zeroed, $c_{in}$ is set to zero, and multiplexer 109 chooses the input connected to the ALU output, thereby loading the multiplier in the result register (RR). Subsequently, the rop (which holds the partial product) is zeroed, by zeroing both op1, and op2, $c_{in}$ is set to zero, and the multiplexer 105 chooses the input connected to the alu output. Also, the multiplicand is loaded into the lop, and the extra bit (b) is zeroed.

A single Booth iteration, which takes a single clock cycle to execute, consists of the following operations: by examining the lowest two bits of the result register together with the b-bit (which are treated as $a_{2j+1}$, $a_{2j}$ and $a_{2j-1}$), $f_j$ is determined in terms of $f_{zero}$, $f_{two}$, and $f_{minus}$. The lop is multiplied by this $f_j$ and is then added to the partial product (rop) and the result is loaded back into the rop. A carry ($c_{out}$) may be generated from the most significant bit of the n-bit adder (108). Also, the lop is left shifted by two and put back into the lop. Bit 1 (i.e. the bit next to the least significant bit) of the result register is moved to the b-bit and result register is (logically) shifted right by two. This completes the first Booth iteration (j=0), and the first cycle. The above procedure is repeated (without zeroing the partial product, or the b-bit), in order to add the successive terms in the summation of equation (5). The iterations continue for n/2 cycles, or until both the Booth factor and the result register are zero, which indicates that the multiplication is complete. Clearly, in the latter case, the number of cycles required for multiplication depends on the number of non-zero bits of the multiplier, with the maximum cycles to compute the result being n/2 (and two cycles for initialization).

The foregoing has illustrated the operation of the Booth multiplier according to principles known in the art.

Additional Hardware to set the Carry and Overflow Flags: In accordance with the present invention, additional hardware is required for setting the carry and overflow flags as described below. Note that in FIG. 1, the number of bits in a given register is as shown by illustrative register 112, where n-bits (arrayed from n−1 as the most significant bit down to bit 0 as the least significant bit) are indicated. The additional bit n is used for implementing the inventive technique, which hence requires a register of n+1 bits. (Similarly, if an additional bit n+1 is required, the register size required is n+2 bits). Note that these additional bits are not required for implementing the Booth multiplier according to prior art techniques.

Changes to the data path: The Booth factor multiplication section (102, 103, 104), the rop (106), the mux for rop (105), the zero generate for op2 (107) and the ALU have to be changed to (n+1) bits wide. Furthermore, the lop (101), and the mux for the lop (100), have to be changed to (n+2) bits wide. These elements are shaded in the FIG. 1. In the beginning of multiplication, the two extra bits of the lop, and the extra bit of rop are initialized to zero.

Control signals: The description and logical expression for the control signals is as follows:

1. We require the values of $f_{zero}$ and $f_{minus}$ from the previous cycle, which will be denoted by $F_{Zero}$ and $F_{Minus}$, respectively. The latter two values are not updated if $f_{zero}$ is true in the last cycle, i.e. they are the previous values of the non-zero Booth factor (except initially, when they are zero). As used herein, a signal name with a capital first letter denotes the value of the corresponding signal with a small first letter from the previous cycle. Signal pairs $f_{zero}$, $F_{Zero}$, and $f_{minus}$, $F_{Minus}$ can be implemented as master-slave latches, and are all initialized to zero.

2. mlpsign: This is the sign of the multiplier, true indicates that the multiplier is negative.

3. mlcsign: This is the sign of the multiplicand, true indicates that the multiplicand is negative.

Figure 5:
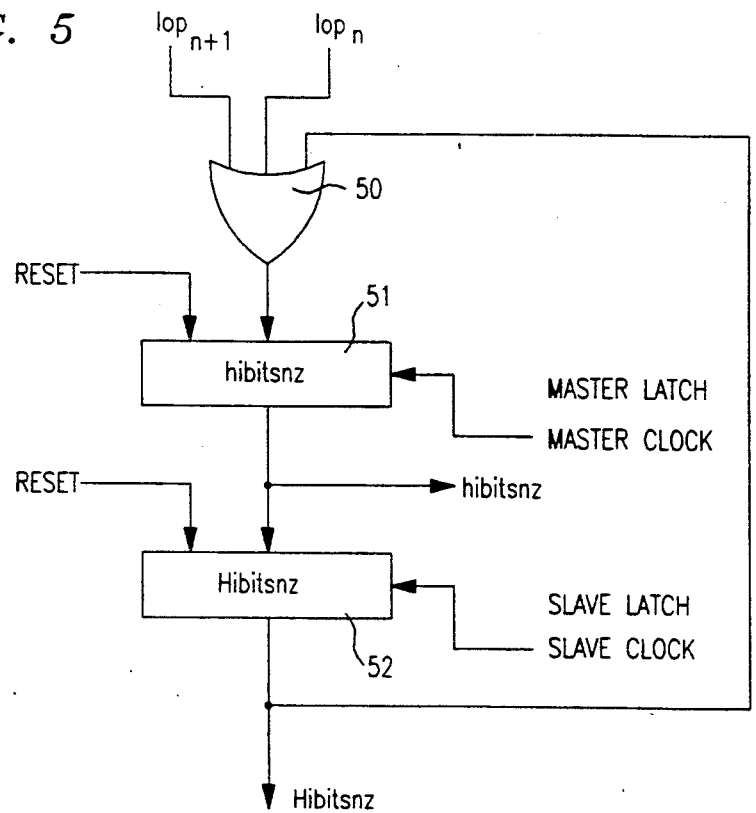
FIG. 5 shows a logic diagram for generating the signals hibitsnz and Hibitsnz.

4. hibitsnz (hi bits of the lop are not zero): this signal indicates that high bits shifted out to the left (beyond the lower n-bits) from the lop up to the present iteration are non-zero, i.e., there are more than n significant bits in the lop. Since the lop is shifted left two bits at a time, it is possible to set this signal by examining the two extra bits of lop:

$$\text{hibitsnz} = \text{lop}_{n+1} \lor \text{lop}_n \lor \text{Hibitsnz} \qquad (9)$$

where, Hibitsnz is the value of hibitsnz from the previous cycle, and the two signals can be implemented as a master-slave latch, which can be initialized to zero. An exemplary circuit for this purpose is shown in FIG. 5.

5. hiallone (hi bits of the multiplicand are all one): This signal indicates that the bits left shifted out of the lop are all one.

$$\text{hiallone} = \text{lop}_{n+1} \land \text{lop}_n \land \text{Hiallone}$$

Figure 6:
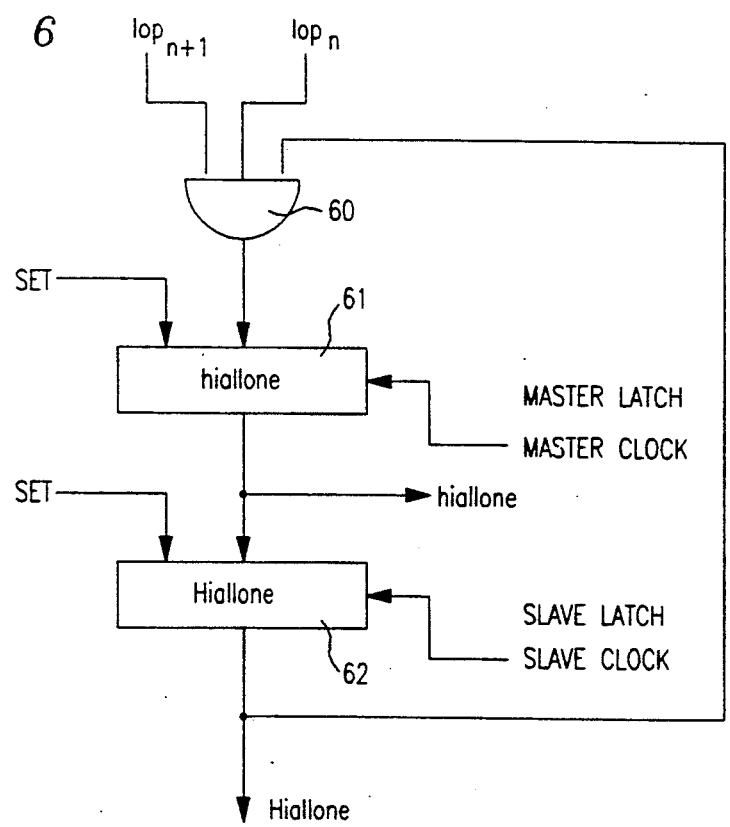
FIG. 6 shows a logic diagram for generating the signals hiallone and Hiallone.

Hiallone is the value of hiallone from the previous cycle. Hiallone is set true in the beginning of the Booth multiplication. hiallone and Hiallone can be implemented as a master-slave latch. An exemplary circuit for this purpose is shown in FIG. 6.

6. mlczero: This signal indicates that the multiplicand is zero. If there are less than n−2 significant bits of lop and after subtracting it from the partial product the most significant bit of the result is not set, then the lop must be zero:

$$\text{mlczero} = \qquad (10)$$

$$\overline{\{\overline{F_{minus}} \land \overline{\text{hibitsnz}} \land f_{minus} \land \overline{\text{lop}_{n-1}} \land \overline{\text{lop}_{n-2}} \land \overline{\text{alu}_{n-1}}\}}$$

$$\lor \{\text{Miczero}\}$$

where Mlczero is the value of mlczero from the previous cycle. The signals mlczero and Mlczero can be implemented as a master-slave latch and initialized to zero, in a manner similar to that shown in FIG. 5. The above logic thus obviates a need for zero comparison logic for lop.

7. hiprodff (hi word of the product is 0xff ...): This indicates that all the bits of the upper word of the product are one. In the following expression, the first term sets hiprodff the first time the Booth factor becomes negative and the multiplicand has up to n significant bits and is non-zero. The second and third terms keep hiprodff set if the Booth factor is zero, or if it is negative and the multiplicand has up to n significant bits, respectively.

$$\text{hiprodff} = \{\overline{F_{minus}} \land \overline{\text{hibitsnz}} \land f_{minus} \land \overline{\text{mlczero}}\} \qquad (11)$$

$$\lor \{\text{Hiprodff} \land f_{zero}\} \lor \{\text{Hiprodff} \land f_{minus} \land \overline{\text{hibitsnz}}\}$$

The signals hiprodff and Hiprodff may also be generated using master-slave circuitry in analogy to that shown in FIG. 5.

Figure 3:
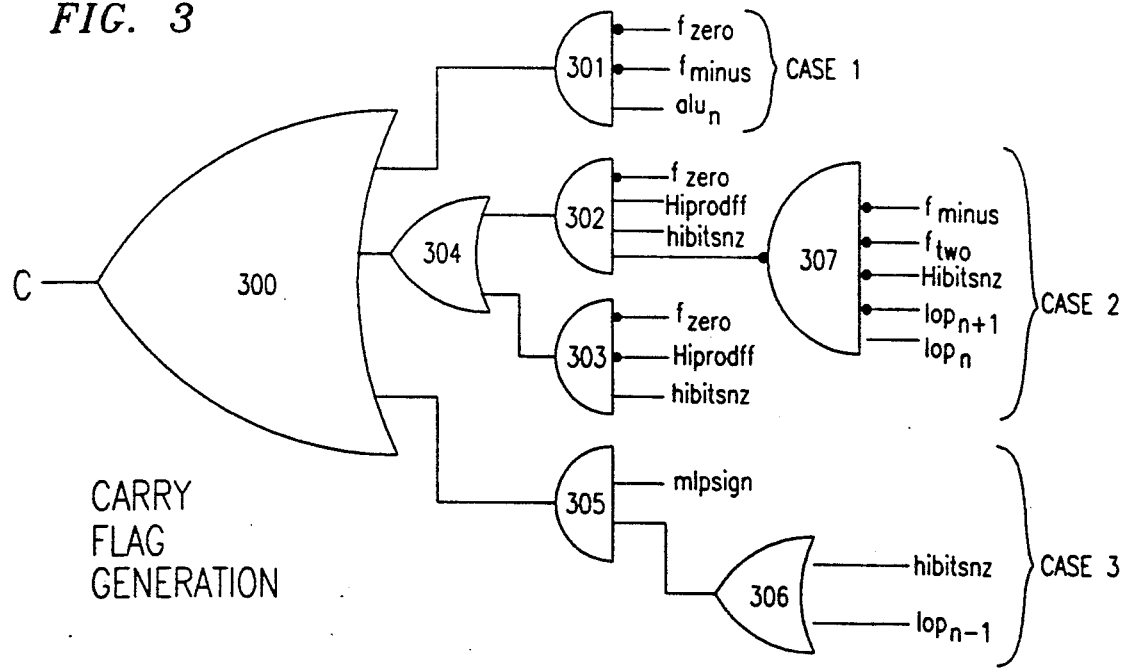
FIG. 3 shows a logic diagram for generating the carry flag (C).

The Unsigned Overflow Flag: In the following cases, the carry flag (C) should be set. In order to illustrate why a given term is needed, a word size n=8 is assumed in the examples below. A logic diagram implementing these cases is shown in FIG. 3.

Case 1: In this case, the carry flag is set if the Booth factor is positive, and $\text{alu}_n$ is set (e.g. 0x03*0x7f):

$\overline{f_{zero}} \wedge \overline{f_{minus}} \wedge alu_n$

Case 2: In the following, the first term covers the case when the previous iteration gives the upper word to be all one's and in the present iteration the multiplicand has more than n significant bits (e.g. 0xff*0x7f). It also guards against the case where $f_j=1$, and 1 gets added to the upper word of the result, thereby zeroing it (e.g. 0x04*0x3f). The second term covers the case where the upper word of the result from the previous iteration was not all one's and the lop has more than n significant bits (e.g. 0xff*0x7d).

$\overline{f_{zero}} \wedge \overline{Hiprodff} \wedge hibitsnz$ $\{\overline{f_{minus}} \wedge \overline{f_{two}} \wedge \overline{Hibitsnz} \wedge \overline{lop_{n+1}} \wedge lop_n\}$ $\vee \{\overline{f_{zero}} \wedge \overline{Hiprodff} \wedge hibitsnz\}$ Case 3: This case corresponds to the first term in (5) where if the multiplier is negative and the multiplicand is other than zero or one (e.g. 0xff*0x02). In this case the upper word of the result is non-zero, and hence the carry flag has to be set.

$mlpsign \wedge (hibitsnz \vee lop_{n-1})$

Figure 4:
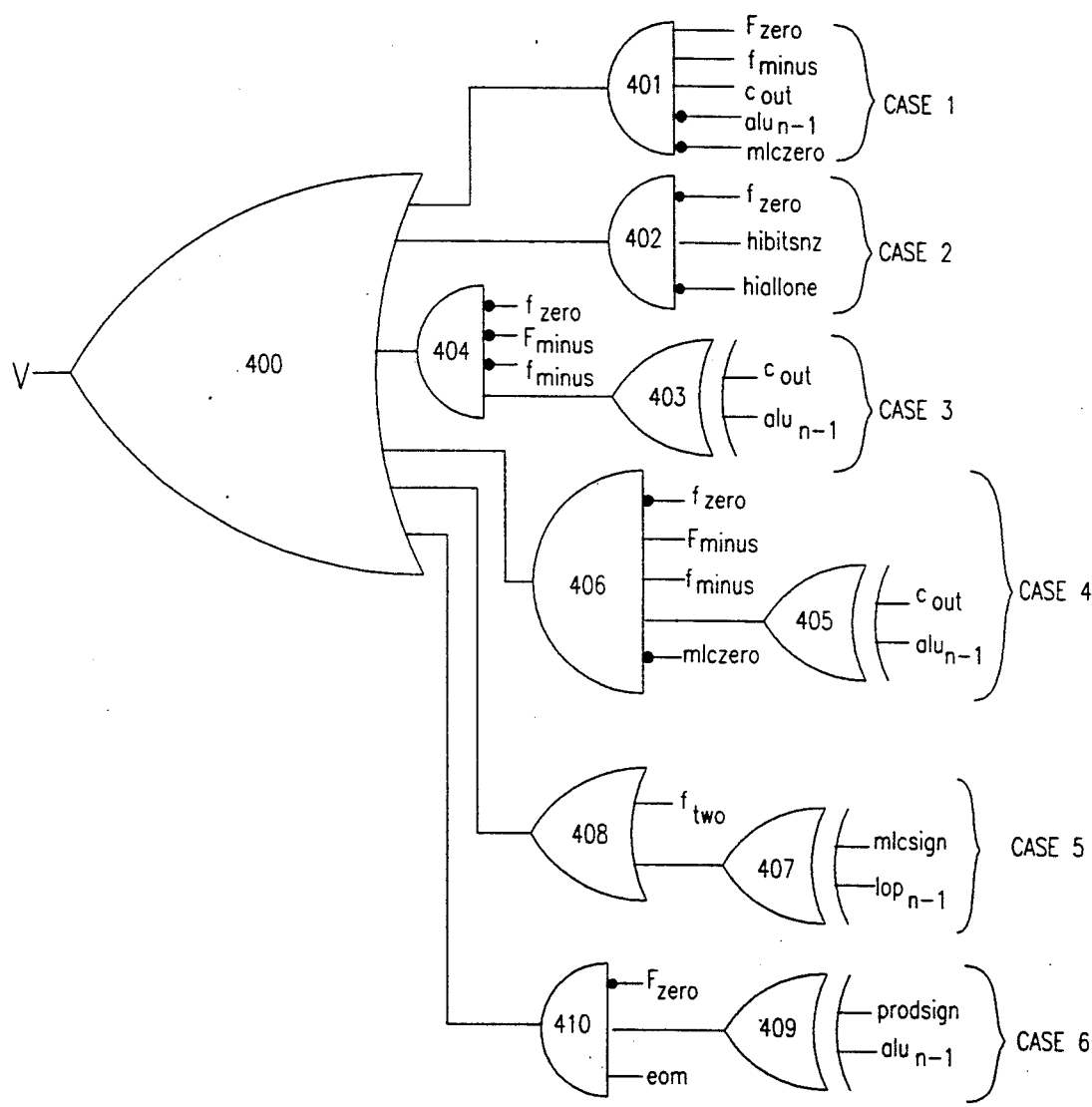
FIG. 4 shows a logic diagram for generating the overflow flag (V).

The Signed Overflow Flag: In the following cases, the overflow flag (V) should be set. These cases are also illustrated by giving examples for n=8. A logic diagram for implementing these cases is given in FIG. 4.

Case 1: If the first non-zero value of the Booth factor is negative and there is a carry ($c_{out}$) from the $(n-1)^{th}$ bit of alu, but $alu_{n-1}$ is not set, and the multiplicand is not zero (e.g. 0xc0*0xfc) then the overflow flag should be set.

$F_{zero} \wedge f_{minus} \wedge c_{out} \wedge \overline{alu_{n-1}} \wedge \overline{mlczero}$ Case 2: In this case if the lop is more than n-bits wide and the upper significant bits of the multiplicand are not all one (e.g. 0xaa*0xfd) then the overflow flag should be set. This way we guard against setting the overflow flag when the multiplicand is negative and the final product has up to n significant bits. $f_{zero}$ hibitsnz hiallone Case 3: In this case, it should be noted that even though addition/subtraction is done on the lower n bits of the partial product and the scaled multiplicand, the sign is the same as that of the previous and present Booth factor respectively. Thus, if the non-zero Booth factor is positive in two successive iterations, and if the carry from $(n-1)^{th}$ bit ($c_{out}$) is not the same as $alu_{n-1}$ (e.g. 0xcc*0xfb, and 0x3f*0xfb), then the overflow flag should be set.

$\overline{f_{zero}} \wedge \overline{F_{minus}} \wedge \overline{f_{minus}} \wedge (c_{out} \oplus alu_{n-1})$ where $\oplus$ represent the exclusive OR operation (XOR).

Case 4: This case is similar to the above case, except the previous and present non-zero Booth factor are negative in two successive iterations (e.g. 0x03*0x5f, and 0xfd*0x5f).

$\overline{f_{zero}} \wedge F_{minus} \wedge f_{minus} \wedge (c_{out} \oplus alu_{n-1}) \wedge \overline{mlczero}$ Case 5: In this case the Booth factor is ±2 and the multiplicand is positive and the $(n-1)^{th}$ bit of lop ever becomes 1 (e.g. 0xfd*0x7f), or if the multiplicand is negative and the $(n-1)^{th}$ bit of lop ever becomes zero (e.g. 0xdb*0xfa).

$f_{two} \wedge (mlcsign \oplus lop_{n-1})$

Case 6: At the end of the multiplication, if the sign of the product (i.e. $alu_{n-1}$) is not consistent with that of the sign expected from that of the multiplier and the multiplicand (e.g. 0x80*0xff, and 0x7f*0xfe), then the overflow flag should be set.

$\overline{F_{zero}} \wedge \{prodsign \oplus alu_{n-1}\} \wedge eom$ wherein prodsign=mlpsign $\oplus$ mlcsign, and "eom" is an end-of-multiplication signal.

Other Embodiments: Note that the above illustrative embodiment has been in terms of a multiplier that uses 3-bit Booth recoding to generate the Booth factor $f_j$. However, the present invention may be used with multipliers using 4-bit or 5-bit Booth recoding to generate $f_j$. In those cases, the lop register requires more than n+2 bits. In addition, the rop may require more than n+1 bits. Furthermore, the above description has assumed that both the C and V flags are examined after a given multiplication, so that overflow from either an unsigned or signed overflow operation may be detected. However, that need not be the case. That is, separate instructions may be provided for unsigned and signed multiplication. In that case, only the flag associated with the instruction actually performed need be examined. For example, the circuitry for generating the C flag alone may be provided, which would provide the required overflow indication when an "unsigned multiply" instruction was performed. When performing a "signed multiply", the operands could be converted to unsigned form, and then the result converted back to the signed form, thereby still allowing use of the C flag to indicate overflow.

On the other hand, if the signed overflow (V) flag only is implemented, certain of the circuitry may be reduced in size. That is, the generate zero means (102), the left-shift means (103), the one's complement means (104), the 2-to-1 mux (105), the rop (106), the generate zero (107), and n-bit adder (108) need have only n-bits, rather than n+1 as shown above.

The overflow signal resulting from the present technique may be used to set a flag that is provided externally to the integrated circuit. In the case, the programmer may modify the operands to prevent overflow, or take other steps when an overflow is indicated. However, other uses are possible. For example, the overflow signal(s) generated by the inventive technique may be used to change the operand sizes and/or the precision of the arithmetic operation in the LISP language, or other object-oriented languages. In that case, the operand may initially be the smallest size when a multiplication is performed. Then, after the multiplication (signed or unsigned), the appropriate flag (V or C) may be tested, and if there is an overflow, the operand size may be suitably increased. Hence, a given overflow flag may be used internally on the chip in which it is generated (as to set the contents of a register) in some cases.

Although the above illustrative embodiment has been given in terms of an iterative Booth multiplier employing a single ALU (i.e., with a single adder), other implementations are possible. For example, a multiple-adder technique allows for reducing the number of iterations required to perform the Booth multiplication. It is even possible to employ a sufficient number of adders that only a single pass through the adders is required. The present technique may be used with all such implementations of the multiplier ciruitry. Finally, although a specific implementation of the present invention has been given in terms of the signals hitbitsnz, hiallone, mlczero, and hiprodff (and their previous values), the circuitry may be partitioned in different manners, thereby generating other signals that may be used to implement the present invention.

I claim:

1. An integrated circuit comprising means for multiplying a multiplicand (A) having n significant bits and a multiplier (B) having n significant bits, in order to generate a result (R) having n significant bits, wherein said means for multiplying includes means for generating the Booth factors ($f_j$) from said multiplier, and wherein said integrated circuit further comprises means for setting an overflow flag (V) when the number of bits of the product of a signed multiplicand and a signed multiplier is greater than n;

and wherein said means for multiplying comprises a left-operand register having n bits;

and wherein said means for setting comprises at least 2 additional bits of said left-operand register into which the most significant bits of said multiplicand (A) are shifted.

2. The integrated circuit of claim 1 wherein said means for generating the Booth factors ($f_j$) comprises:

(1) a generate zero means having at least n+1 bits and controlled by a signal $f_{zero}$ generated by means for determining that a Booth factor is zero;

(2) a left-shift means having at least n+1 bits and controlled by a signal $f_{two}$ generated by means for determining that a Booth factor equals 2;

(3) a one's complement means having at least n+1 bits and controlled by a signal $f_{minus}$ generated by means for determining that a Booth factor is negative;

and still further comprises means for storing said signals $f_{zero}$ and $f_{minus}$ from a previous cycle, thereby producing signals $F_{zero}$ and $F_{minus}$.

3. An integrated circuit comprising means for multiplying a multiplicand (A) having a significant bits and a multiplier (B) having n significant bits, in order to generate a result (R) having n significant bits, wherein said means for multiplying includes means for generating the Booth factors ($f_j$) from said multiplier;

and wherein said integrated circuit further comprises means for setting a carry flag (C) when the number of bits of the product of an unsigned multiplicand and an unsigned multiplier is greater than n;

and wherein said means for multiplying comprises a left-operand register having n bits;

and wherein said means for setting comprises:

(1) at least 2 additional bits of said left-operand register into which the most significant bits of said multiplicand (A) are shifted;

(2) a right-operand register having at least n+1 bits that initially receives said multiplier (B) having n bits, and subsequently receives the output of an adder having at least n+1 bits to thereby store a partial product; and (3) additional means for multiplying the multiplicand (A) and a Booth factor to produce a result that is added by said adder to the partial product located in the right-operand register.

4. The integrated circuit of claim 3 wherein said means for generating the Booth factors ($f_j$) comprises:

(1) a generate zero means having at least n+1 bits and controlled by a signal $f_{zero}$ generated by means for determining that a Booth factor is zero;

(2) a left-shift means having at least n+1 bits and controlled by a signal $f_{two}$ generated by means for determining that a Booth factor equals 2;

(3) a one's complement means having at least n+1 bits and controlled by a signal $f_{minus}$ generated by means for determining that a Booth factor is negative;

and still further comprises means for storing said signals $f_{zero}$ and $f_{minus}$ from a previous cycle, thereby producing signals $F_{zero}$ and $F_{minus}$.

* * * * *